Sept. 19, 1950  C. FIELD  2,522,506
ICE-MAKING APPARATUS
Original Filed Aug. 30, 1946  5 Sheets-Sheet 1
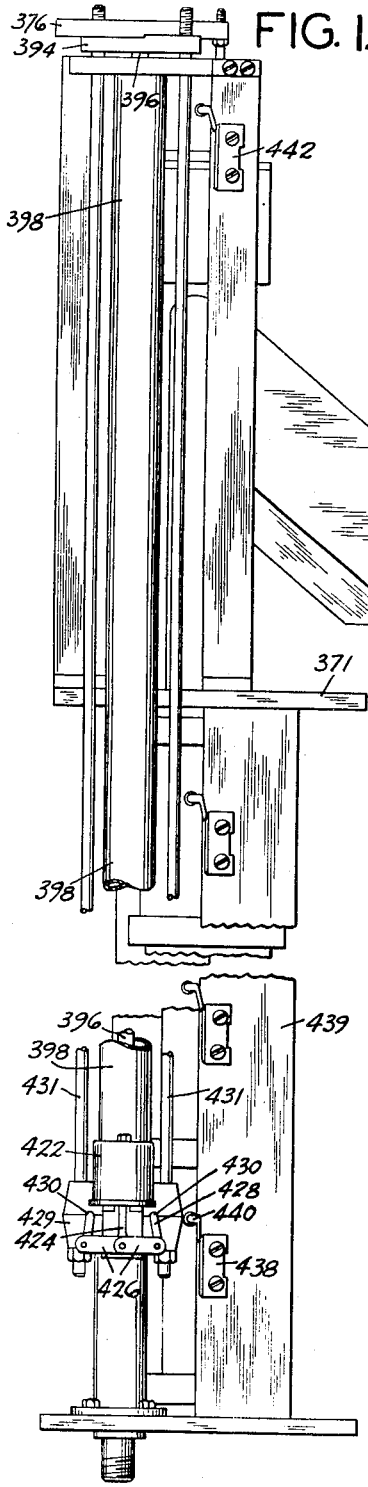
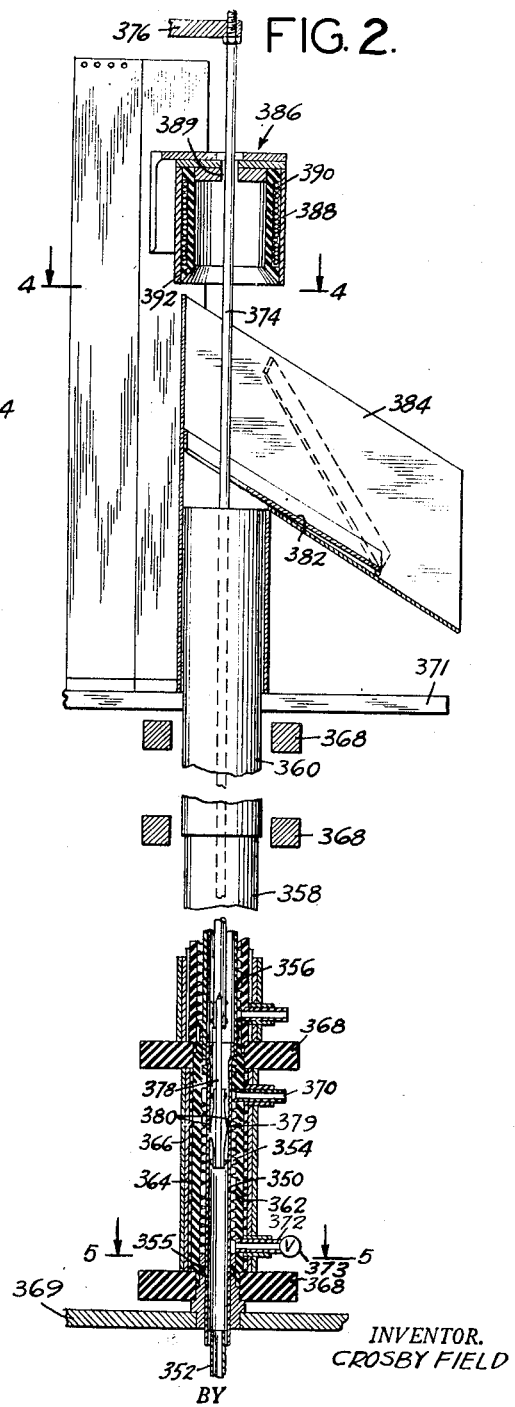
INVENTOR.
CROSBY FIELD
BY
Curtis, Morris + Safford
ATTORNEYS.

Sept. 19, 1950  C. FIELD  2,522,506
ICE-MAKING APPARATUS
Original Filed Aug. 30, 1946  5 Sheets-Sheet 2
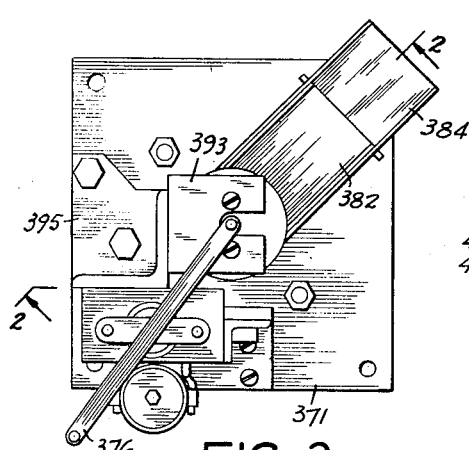
FIG. 3.
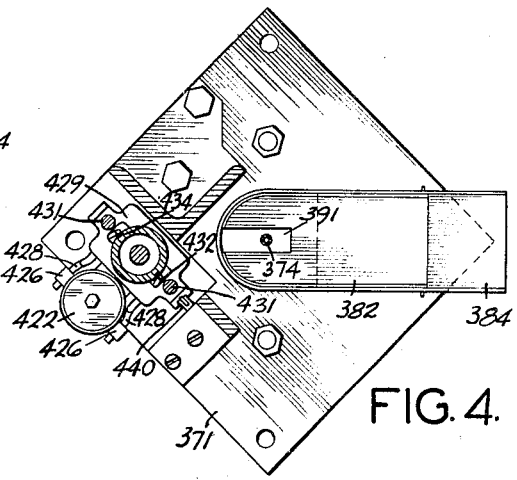
FIG. 4.
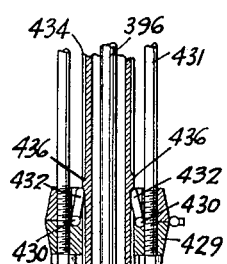
FIG. 6.
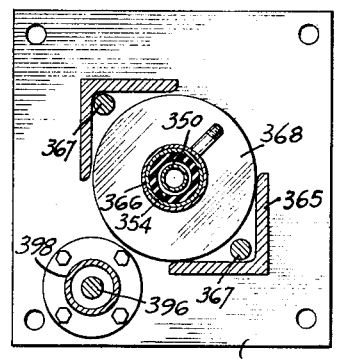
FIG. 5.
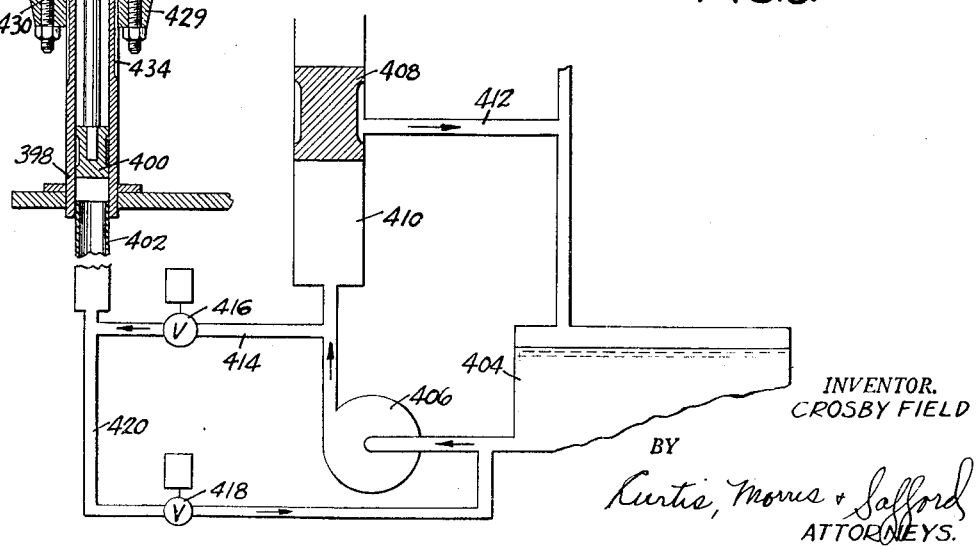
INVENTOR.
CROSBY FIELD
BY
Curtis, Morris & Safford
ATTORNEYS.

Sept. 19, 1950          C. FIELD          2,522,506
ICE-MAKING APPARATUS
Original Filed Aug. 30, 1946          5 Sheets-Sheet 3
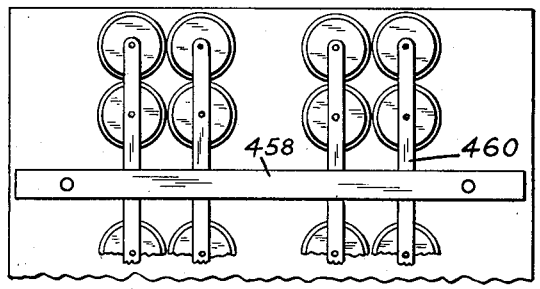
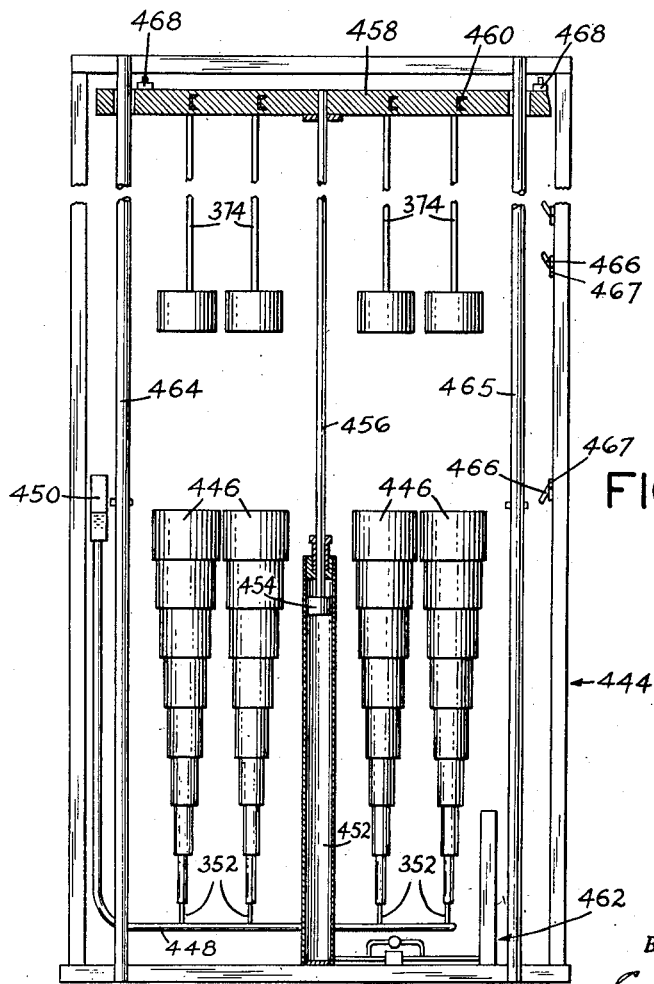
INVENTOR.
CROSBY FIELD Sept. 19, 1950     C. FIELD     2,522,506
ICE-MAKING APPARATUS Original Filed Aug. 30, 1946     5 Sheets-Sheet 4

INVENTOR.
CROSBY FIELD
BY
Curtis, Morris & Safford
ATTORNEYS.

Sept. 19, 1950     C. FIELD     2,522,506
ICE-MAKING APPARATUS
Original Filed Aug. 30, 1946     5 Sheets-Sheet 5
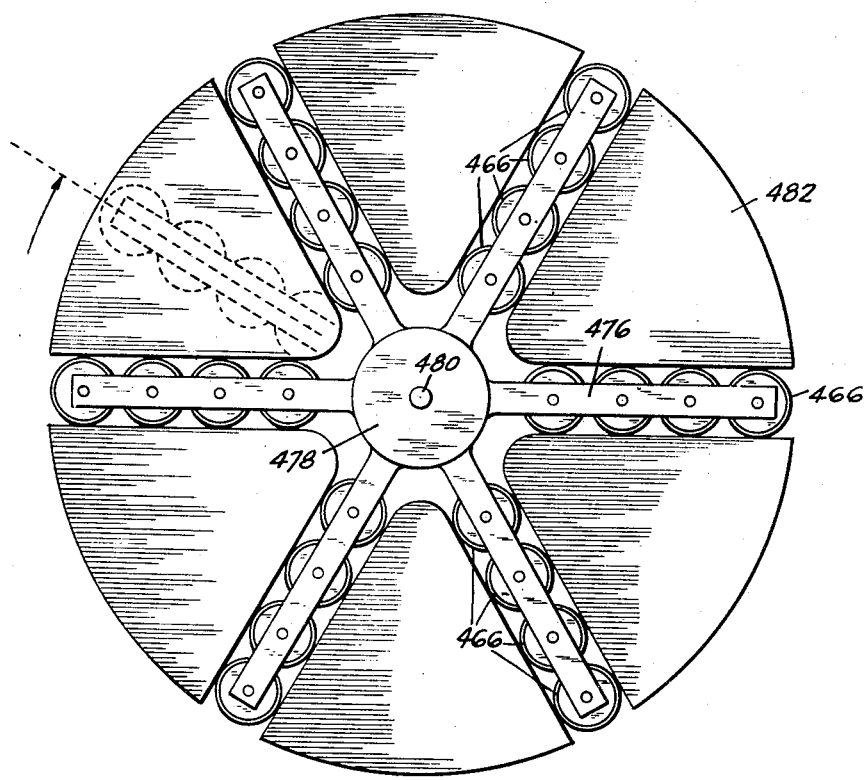
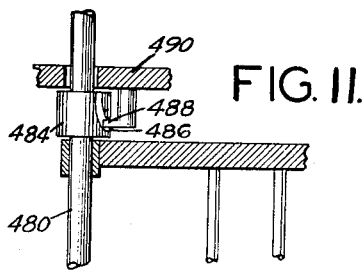
INVENTOR.
CROSBY FIELD
BY
Curtis, Morris + Safford
ATTORNEYS.

Patented Sept. 19, 1950

2,522,506

UNITED STATES PATENT OFFICE 2,522,506

ICE-MAKING APPARATUS

Crosby Field, Brooklyn, N. Y., assignor to Flakice Corporation, Brooklyn, N. Y., a corporation of Delaware Original application August 30, 1946, Serial No. 693,994. Divided and this application April 5, 1949, Serial No. 85,531

5 Claims. (Cl. 62—106)

This invention relates to the congealing of liquids and, more particularly, to the making of ice by freezing laminae or layers into large pieces of more or less regular configurations.

An object of this invention is to provide for the congealing of liquids such as water, cream, fruit juices and the like in a thoroughly dependable and practical manner. A further object is to provide for the freezing of liquids to form layers or laminae which may be frozen together to form large pieces of ice. A further object is to provide automatic apparatus for carrying out the above of such character as to be readily adaptable to varying conditions of use. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings in which are shown several of many possible embodiments of the invention:

Figure 1 is a side elevation with parts broken away of ice-making apparatus embodying the invention;

Figure 2 is a vertical section of the apparatus of Figure 1 on the line 2—2 of Figure 3;

Figure 3 is a top plan view of the apparatus of Figure 1;

Figure 4 is a sectional view on the line 4—4 of Figure 2;

Figure 5 is a sectional view on the line 5—5 of Figure 2;

Figure 6 is a partially schematic view of the hydraulic system of the apparatus of Figures 1 to 5;

Figure 7 is a partial top plan view of another embodiment of the invention;

Figure 8 is a side elevation with parts broken away of the embodiment of Figure 7;

Figure 10 is a top plan view of another embodiment of the invention; and

Figure 11 is a fragmentary vertical section showing a portion of the ice lifting mechanism of the embodiment of Figure 10.

Figure 9:
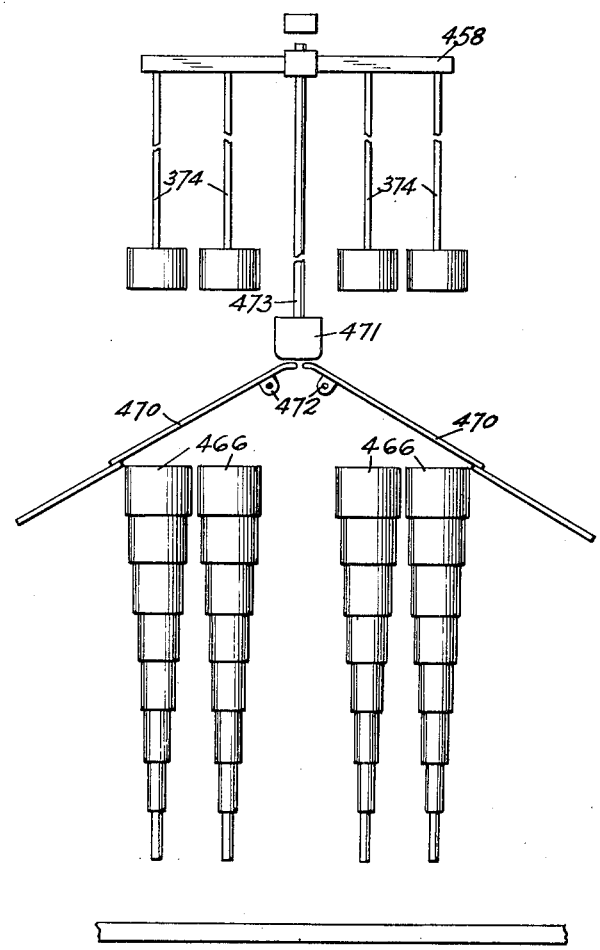
Figure 9 is a view similar to Figure 8 of another embodiment of the invention.

In the present application the term "ice" is at times used in its broader sense as meaning any type of congealed liquid. For example, this term may include all types of water and water-base frozen fluids, such as frozen fruit juices, frozen cream, etc. as well as non-aqueous base frozen fluids. In general, the present application relates to the freezing of thin layers of ice which are of such configuration that they may be fitted at least partially one within another, and these layers are referred to as laminae.

In accordance with the present invention, large pieces of ice are formed by two or more of these laminae, the thickness of the various laminae and the number which are frozen into one piece, as well as the size of the final product, depending upon the many considerations met with in the practice of the invention. The laminae are frozen upon freezing surfaces which in the illustrative embodiments of the invention are generally annular. The freezing surfaces may be cylindrical with the laminae being formed on an outer surface or on an inner surface. Generally speaking, the laminae are made in what may be termed sets or groups so that small laminae fit within larger ones, and those of each group are nested together to form a larger body of ice. The nesting operation is started either with the smallest lamina of the group which is nested into the next larger or with the largest lamina which is nested over the next smallest. However, with certain applications of the invention, the laminae are formed on a single freezing surface of such configuration that after each lamina is formed, it is moved away from the freezing surface a distance equal to the thickness of the next lamina, thus to provide a layer of liquid to be frozen.

The laminae may be handled individually so that one is moved in nesting relationship with respect to the adjacent one by either the action of gravity or by positive mechanical action. The laminae may be caused to fall one within another or they may float upwardly through unfrozen liquid one within another, and the movement may be controlled mechanically or by providing enlarged laminae sections such that an enlarged section on one lamina provides a stop against which the next lamina rests.

The term "harvesting" is used to refer generally to the removal of the ice from the freezing surface, and specifically to the manner in which the adhesion between the ice and the freezing surface is broken. This may be by heating the freezing surface with electrical resistors in contact with the freezing surface or there may be means to cause a flow of electric current through the freezing surface. For example, a heavy electrical current of low potential may be passed through the walls of a cylindrical freezing tube, or current may be induced in the freezing walls by setting up an induction field. This latter is referred to as induction heating and may involve a relatively high frequency potential.

In Figures 1 to 6 an arrangement is provided for automatically freezing, nesting and harvesting ice in the form of cylindrical laminae or ice bodies. In these figures the central portion of the mechanism is broken away so that only four of eight coaxial freezing tubes are shown. At the bottom of the figure the smallest freezing tube 350 has a water inlet pipe 352 and it is surrounded by an evaporator shell 354 to which refrigerant is supplied and withdrawn to obtain the refrigeration effect. At the two ends of the freezing zone in each tube are girdle coils 355 which limit the vertical extent of the laminae formed. Freezing tube 350 is flared at the top and is brazed to the next larger sized tube 356, and there are six additional tubes, the top two of which are shown broken away and are indicated at 358 and 360. Surrounding each of these freezing tubes is a plastic evaporator tube 362 which has a helical passageway forming the evaporator chamber. Wound around each tube 362 is an induction coil 364 and wound around the induction coil are several sheets of silicon steel 366 which provide a laminated flux return path on the outside of the coil.

The freezing tube assemblies thus formed are mounted at their ends by mounting blocks 368 which are discs of plastic. As shown best in Figure 5, these mounting blocks are clamped between a pair of vertical angle bars 365 which are clamped by two stay bolts 367 between a lower base plate 369 and an upper plate 371. Liquid refrigerant is admitted at the top of each of the evaporator chambers through a pipe 370, and gas refrigerant is withdrawn at the bottom through a pipe 372 which has therein a suction cut-off valve 373. A harvesting rod 374 projects downwardly along the axis of the tubes and is supported at the top by a bracket 376. At its lower end the rod carries a plastic extension rod 378 which has mounted thereon a tip 379 formed by a pair of steel springs 380 coated by a plastic covering. Tip 379 is frozen into the smallest lamina and thus provides an attachment to the ice bodies as they are formed.

During the freezing operation, water is supplied through pipe 352 and maintained at the level indicated by a float in an erternal chamber, not shown. When a lamina of ice has formed in tube 350, tip 379 is frozen into its top end and then valve 373 is closed and coil 364 is energized so as to heat the freezing tube and free the lamina. Rod 374 is then raised so as to carry the lamina from tube 350 into nesting relationship with respect to the lamina in tube 356. The two laminae are frozen together and then thawed free and raised to the next tube. In this way, an elongated cylindrical body of ice is built up which is withdrawn from the top of tube 360 and raised so as to swing up and move above a swinging flap 382 which forms a portion of the bottom of an ice chute 384. The top of the ice cylinder is nested into an inverted harvesting cup 386 which has a non-magnetic metal outer wall 388, an induction coil 390, and a plastic inner wall 392. The top wall of cup 386 has an opening 389 therein through which rod 374 extends, and this opening is large enough for tip 379 to pass through it. Therefore, the upper end of the cylinder is pressed against this top wall and then coil 390 is energized with the result that heat is produced in steel springs 380 and this melts tip 379 free. The cylinder of ice drops down chute 384 and the tip moves on up into opening 389.

Rod 374 is then pushed down through a slot 391 in flap 382 and into the tubes again, and in the meantime the freezing operation has been restarted so that there are already thin laminae of ice in the freezing tubes. Due to successive harvesting of the tubes starting with the smallest tube 350, the next harvesting operation can be restarted immediately. Therefore, tip 379 is pushed into the lamina in tube 350, and is immediately frozen fast, and the harvesting operation is started, and the cycle is repeated. It should be noted that with this operation each freezing tube is given the same freezing time and, therefore, a product of uniform, high quality is obtained.

The upper end of rod 374 extends through a slotted plate 393 carried by a bracket 395 mounted on plate 371 and, as pointed out above, rod 374 is supported at its top by a bracket 376. As shown best in Figure 1, bracket 376 is fixed to a plate 394 which is mounted upon the upper end of a piston rod 396 which extends down into a cylinder 398. As shown best in Figure 6, the lower end of rod 396 carries a piston 400, and the lower end of cylinder 398 is connected through a pipe 402 to a hydraulic system which is represented schematically. This system includes a sump tank 404 from which oil is withdrawn by a pump 406. The outlet from pump 406 is maintained at a constant pressure by a floating piston 408 in a cylinder 410, the arrangement being such that when the pressure exceeds the desired value, the piston rises and uncovers a port so as to discharge oil through a pipe 412 back to sump tank 404. For raising piston 400, this constant pressure oil is directed through a pipe 414 to pipe 402, but there is a solenoid valve 416 in pipe 414 which may be closed to cut off the oil pressure. A solenoid valve 418 in an oil return pipe 420 is opened to permit the oil to return from the piston to the sump tank. Pump 406 normally runs continuously and when valve 416 is closed all of the oil is discharged back to the sump tank 404. When valve 418 is open piston 404 returns to the position shown in Figure 6 by gravity.

Thus, the lifting and lowering of rod 374 during the harvesting operation is performed by moving piston 400 upwardly in cylinder 398 utilizing the constant pressure from this hydraulic system. The arrangement is such that the piston moves freely upwardly, except that it is stopped automatically each time that a lamina is to be freed from one of the freezing tubes. The operation is automatic so that after the body of ice has been built up and then released from tip 379, valve 416 is closed and valve 418 is open so that the piston and rod 374 settle back to their lower positions by the action of gravity.

The mechanism for stopping the upward movement of the piston and rod 374 includes a latch operating solenoid 422, shown near the bottom of Figure 1. This solenoid has a plunger 424, the lower end of which is attached to a pair of links 426 which are connected to a pair of lever arms 428. Arms 428 are pivoted at their upper ends on pivots 430 which are mounted in a cam bracket 429, which is slidable vertically on the outer wall of cylinder 398. Solenoid 422 is also mounted on this cam bracket and the entire assemblage is supported by a pair of vertical rods 431, which are fixed at their upper ends to plate 394. Thus, cam bracket 429 and its assemblage move up and down with piston 400 (Figure 6) and tip 379 on the end of rod 374.

As shown in Figure 6, pivots 430 carry latch arms 432 which ride along opposite sides of cylinder 398 with their ends normally positioned in vertical grooves 434 in the sides of the cylinder wall. These grooves are discontinued to form lands or stops 436 at eight vertically spaced levels along the cylinder and the arrangement is such that the latch arms engage these stops and thereby stop the upward progress each time that tip 379 is positioned properly with respect to a lamina in a particular freezing tube. That is, for example, when these latch arms are engaging the lower pair of stops 436, tip 379 is positioned as shown in Figure 2, and thereafter the latch arms stop the upward movement each time that the laminae are nested within a freezing cylinder. After the cylinder of ice has been detached from tip 379, valve 416 is closed and valve 418 is opened as indicated above, and the entire assemblage, including rod 374 and its tip 379, piston 400 and cam bracket 429, moves down by the action of gravity to the position shown.

The entire operation is carried on in accordance with a timed cycle and in addition to a number of time-delay relays (not shown) there are eight switches 438 mounted along a vertical bracket 439 and having operating arms 440 which are engaged and swung to switch-closing position by cam bracket 429. These switches are so positioned that as the assemblage moves upwardly the cam bracket engages one of the switch arms each time that the assemblage is in a harvesting position; that is, with the assemblage positioned as shown in Figures 1 and 2, the lower arm 440 is engaged by the cam bracket so that the lower switch 438 is closed and the closing of this switch initiates the timing operation.

Prior to this time solenoid 422 is deenergized so that latch arms 432 engage stops 436 and hold the assemblage from further upward movement. However, the closing of switch 438 energizes a time-delay relay which is closed after a sufficient time has elapsed for the tip 379 to be securely frozen into the lamina in the tube, thereby to energize solenoid 422 and induction coil 364. The energization of solenoid 422 releases latch arms 432 so that the assemblage may move upwardly at any time that the lamina is freed from the freezing tube; and, the energization of coil 364 heats the freezing tube so as to free this lamina. Simultaneously with the energization of induction coil 364 the outlet pipe 372 from the evaporator chamber is closed by the closing of cut-off valve 373. This causes pressure to build up within the evaporator chamber so as to facilitate the harvesting operation.

The continuous oil pressure which is effective against piston 400 moves the cylinder upwardly whenever the bond between the freezing tube and the lamina is released. The first further movement upwardly carries cam bracket 429 away from arm 440 so that switch 438 is reopened and this deenergizes solenoid 422 and induction coil 364, and valve 373 is reopened. Therefore, latch arms 432 swing back against the cylinder and their ends enter and ride along the next set of grooves 434 with the result that they stop the upward movement of the assemblage when the next pair of stops 436 is encountered. In the meantime, the deenergizing of induction coil 364 and the reopening of valve 373 restarts the ice-forming operation in freezing tube 350. As pointed out above, the upward movement of the assemblage is stopped when the lamina of tube 350 is nested within the lamina of tube 356 and these laminae are permitted to freeze together after which they are freed by the cycle of operations just outlined in connection with the freeing of the lamina from tube 350. This operation is repeated at each of the freezing tubes so that the completed cylinder of ice is harvested from the upper freezing tube 360.

The assemblage then moves upwardly in the same manner so that the cylinder engages and lifts flap 382 and thus passes above chute 384 and has its upper end pressed against the top wall of the harvesting cup 386. At this time a switch 442 is closed by the engagement of cam bracket 429 with its arm 443 and the closing of this switch energizes induction coil 390; this heats springs 380 of tip 379 so that the tip is melted free. In the meantime the assemblage is urged upwardly with the result that when the tip is freed, the assemblage moves on up a short distance with the tip being pulled from the ice cylinder and into opening 389 in cup 386. This further upward movement reopens switch 442 so that induction coil 390 is deenergized and the oil pressure valve 416 is closed while valve 418 is opened. The closing of valve 416 cuts off the oil pressure and the opening of valve 418 permits the oil from the cylinder to return to the sump tank. Therefore, the assemblage descends to the position shown in the figures and the cycle is repeated.

In the embodiments of Figures 7 to 11, inclusive, there are arrangements for operating a large number of the freezing tube assemblies of Figures 1 to 6. Therefore, the freezing tube assemblies are not shown in detail in the embodiments of Figures 7 to 11, it being understood that the details are identical with those of Figures 1 to 6 except as modifications are necessary. Referring particularly to Figures 7 and 8 of the drawings, a casing and frame construction is represented at 444 and it encloses sixteen freezing tube assemblies 446 which are positioned in rows of four. The water supply tubes 352 are connected through a pipe 448 to a water level tank 450 at which is positioned a float valve (not shown) for maintaining the water level slightly above the top of the upper freezing zone as indicated. A large oil cylinder 452 has therein a piston 454, the piston rod 456 of which carries a horizontal frame member 458. Extending transversely of this frame member are four channel bars 460, which, as shown in Figure 7, carry the harvesting rods 374 of the freezing tube assemblies.

The oil pressure system is indicated at 462 and it operates in the manner outlined above to raise the assemblage step-by-step and the ice is harvested from all of the freezing tube assemblies simultaneously. The vertical movement of the assemblage is guided by a pair of guide posts 464 and 465 rigidly mounted in the casing. Frame member 458 carries a pair of pressure switches 468, and mounted along the casing wall adjacent post 465 are switches 467 which are operated through their operating arms 466 by a cam surface on the end of frame member 458. These switches control the cycle of operation which is identical with that of the individual freezing tube assembly of Figures 1 to 6.

In the embodiment of Figure 9 the freezing tube assemblies and the harvesting arrangement is similar to that of Figures 7 and 8. However, a chute arrangement is provided for deflecting the bodies of ice to storage bins. Here the tips to which the ice bodies are attached on the ends of the rods 374 are provided with resistance heaters and directly over the freezing tube assemblies are two swingable chute members 470. These chute members are pivoted at 472 and they are adapted to swing upwardly to a vertical position so that rods 374 may be projected into the freezing tube assemblies for harvesting the ice.

Chute members 470 are rocked from the rest position shown to the vertical position by a weight 471 which is positioned at the adjacent edges of the chute members so that when the weight is not otherwise supported, it rests on the chute members and swings them to their vertical position. Weight 471 is supported by a vertical rod 473 which is mounted for limited vertical movement but which is mechanically connected to the frame member 458 which carries rods 374. The arrangement is such that the initial downward movement of frame member 458 causes rod 473 to move downwardly at a rapid rate so that weight 471 raises the chute members. The weight then holds the chute members raised while rods 374 are moved down into the freezing tube assemblies. After the ice bodies have been freed and raised to the position shown, weight 471 is lifted and the chute members return to the position shown. The resistors in the tips holding the bodies of ice are then energized and the ice bodies are released and slide down the chute members to the bins (not shown).

In the embodiments of Figures 10 and 11 a similar arrangement is provided wherein six evenly spaced arms 476 (see Figure 10) are carried by a central hub 478 which is mounted on a vertical plunger 480. Here the freezing and harvesting is as outlined above except that when the assemblage approaches its extreme upper position, the entire assemblage is swung through an arc of 30° thus to position arms 476 and the cylinders of ice supported thereby over the radial chutes 482. These chutes extend outwardly and downwardly and the bodies of ice are released to fall into the chutes which extend to suitable bins. The bodies of ice are released as in Figure 9 by resistance heaters in the rod tips which carry the ice.

The rotation of the assemblage is provided by the cam arrangement shown in Figure 11. Plunger 480 carries a cam member 484 which has therein a helical cam groove 486, and as the plunger approaches the fully elevated position this cam groove rides upwardly onto a radial pin 488 carried by a stationary frame member 490. Radial pin 488 therefore cooperates with the cam groove to rotate the assemblage as indicated. After the ice bodies have been released, the initial downward movement of the plunger causes the cam groove to ride down and around on pin 488 so as to return the assemblage to the position shown in Figure 11.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In ice-making apparatus, the combination of, a plurality of freezing tube assemblies having cylindrical internal freezing surfaces of different diameters which are positioned in axial alignment with the cylinder of smallest diameter at the bottom, a vertically positioned rod having a harvesting tip on its lower end which is adapted to enter and be frozen to the smallest cylinder of ice, and means to move said rod downwardly through said freezing tube assemblies and to position said tip in the smallest cylinder of ice and thereafter to harvest the smallest cylinder of ice and move the tip and the adhered ice upwardly step-by-step from one freezing tube assembly to the next thereby to build up a cylindrical body of ice.

2. Apparatus as described in claim 1 wherein said rod is moved upwardly by a hydraulic system including a vertical cylinder and electrically controlled operating mechanism.

3. Apparatus as described in claim 1 which includes, induction coils for carrying on the harvesting operation for the various freezing tube assemblies, and a harvesting cup into which is moved the harvesting tip with the cylindrical body of ice thereon and in which the cylindrical body of ice is freed.

4. An ice-making plant comprising, a plurality of ice-making units as described in claim 1, and means to harvest the ice bodies from all of the ice-making units, simultaneously.

5. An ice-making plant comprising, a plurality of ice-making units as described in claim 1 which are positioned in radial rows about a hydraulic ram system, chute means positioned between said radial rows, and means to revolve a plunger with a group of ice bodies thereon and to deposit the ice bodies on said chute means.

CROSBY FIELD.

No references cited.